(12) United States Patent
Brandt

(10) Patent No.: US 11,210,545 B2
(45) Date of Patent: Dec. 28, 2021

(54) SYSTEM AND METHOD FOR CHARACTER RECOGNITION MODEL AND RECURSIVE TRAINING FROM END USER INPUT

(71) Applicant: THE COCA-COLA COMPANY, Atlanta, GA (US)

(72) Inventor: William Patrick Brandt, Decatur, GA (US)

(73) Assignee: The Coca-Cola Company, Atlanta, GA (US)

( * ) Notice: Subject to any disclaimer, the term of this patent is extended or adjusted under 35 U.S.C. 154(b) by 56 days.

(21) Appl. No.: 16/486,652

(22) PCT Filed: Feb. 15, 2018

(86) PCT No.: PCT/US2018/018331
§ 371 (c)(1),
(2) Date: Aug. 16, 2019

(87) PCT Pub. No.: WO2018/152304
PCT Pub. Date: Aug. 23, 2018

(65) Prior Publication Data
US 2020/0327352 A1    Oct. 15, 2020

Related U.S. Application Data

(60) Provisional application No. 62/460,601, filed on Feb. 17, 2017.

(51) Int. Cl.
*G06K 9/34* (2006.01)
*G06K 9/22* (2006.01)
*G06K 9/62* (2006.01)
*G06N 3/04* (2006.01)

(52) U.S. Cl.
CPC ............... *G06K 9/344* (2013.01); *G06K 9/22* (2013.01); *G06K 9/346* (2013.01); *G06K 9/6254* (2013.01); *G06N 3/0454* (2013.01)

(58) Field of Classification Search
CPC ........................ G06N 3/0454; G06T 7/50–593
See application file for complete search history.

(56) References Cited

U.S. PATENT DOCUMENTS

| 5,708,727 A | 1/1998 | Tanaka et al. |
| 2007/0009151 A1 | 1/2007 | Pittman et al. |

(Continued)

OTHER PUBLICATIONS

CokeRewardsPointsApp, found at https://256.makerslocal.org/wiki/CokeRewardsPointsApp (Year: 2013).*

(Continued)

*Primary Examiner* — Casey L Kretzer
(74) *Attorney, Agent, or Firm* — Meunier Carlin & Curfman LLC

(57) ABSTRACT

One embodiment of a system and process of reading a multi-character code may include identifying regions in which respective characters of the code reside in response to receiving an image of the multi-character code. The identified regions may be applied to a neural network to determine the respective characters in the identified regions. The determined characters may be displayed in an ordered sequence for a user to visually inspect to confirm that each of the determined characters are correct.

17 Claims, 10 Drawing Sheets

(56) References Cited

U.S. PATENT DOCUMENTS

| | | | | |
|---|---|---|---|---|
| 2011/0093263 | A1* | 4/2011 | Mowzoon | G10L 15/26 |
| | | | | 704/235 |
| 2012/0029994 | A1 | 2/2012 | Barkan et al. | |
| 2014/0009612 | A1 | 1/2014 | King | |
| 2014/0037181 | A1* | 2/2014 | Koo | G06K 9/6814 |
| | | | | 382/135 |
| 2014/0369566 | A1 | 12/2014 | Chigos et al. | |
| 2015/0206033 | A1* | 7/2015 | Krivosheev | G06K 9/00456 |
| | | | | 382/161 |
| 2015/0371085 | A1* | 12/2015 | Hudson | G06K 9/00456 |
| | | | | 382/176 |
| 2016/0086078 | A1* | 3/2016 | Ji | G06N 3/0454 |
| | | | | 382/157 |
| 2016/0350591 | A1 | 12/2016 | Kraft | |
| 2017/0300788 | A1* | 10/2017 | Cao | G06K 9/6267 |
| 2017/0344824 | A1* | 11/2017 | Martin | G06K 9/036 |
| 2020/0151591 | A1* | 5/2020 | Li | G06N 20/00 |

OTHER PUBLICATIONS

International Search Report and Written Opinion, issued by the International Searching Authority (ISA/KR) in PCT application No. PCT/US2018/018331 dated May 16, 2018. 12 pages.
International Preliminary Report on Patentability issued by the International Bureau of WIPO in Application No. PCT/US2018/018331 dated Aug. 29, 2019. 9 pages.
Extended European Search Report for European Application No. 18754157.8 dated Dec. 11, 2020.

* cited by examiner

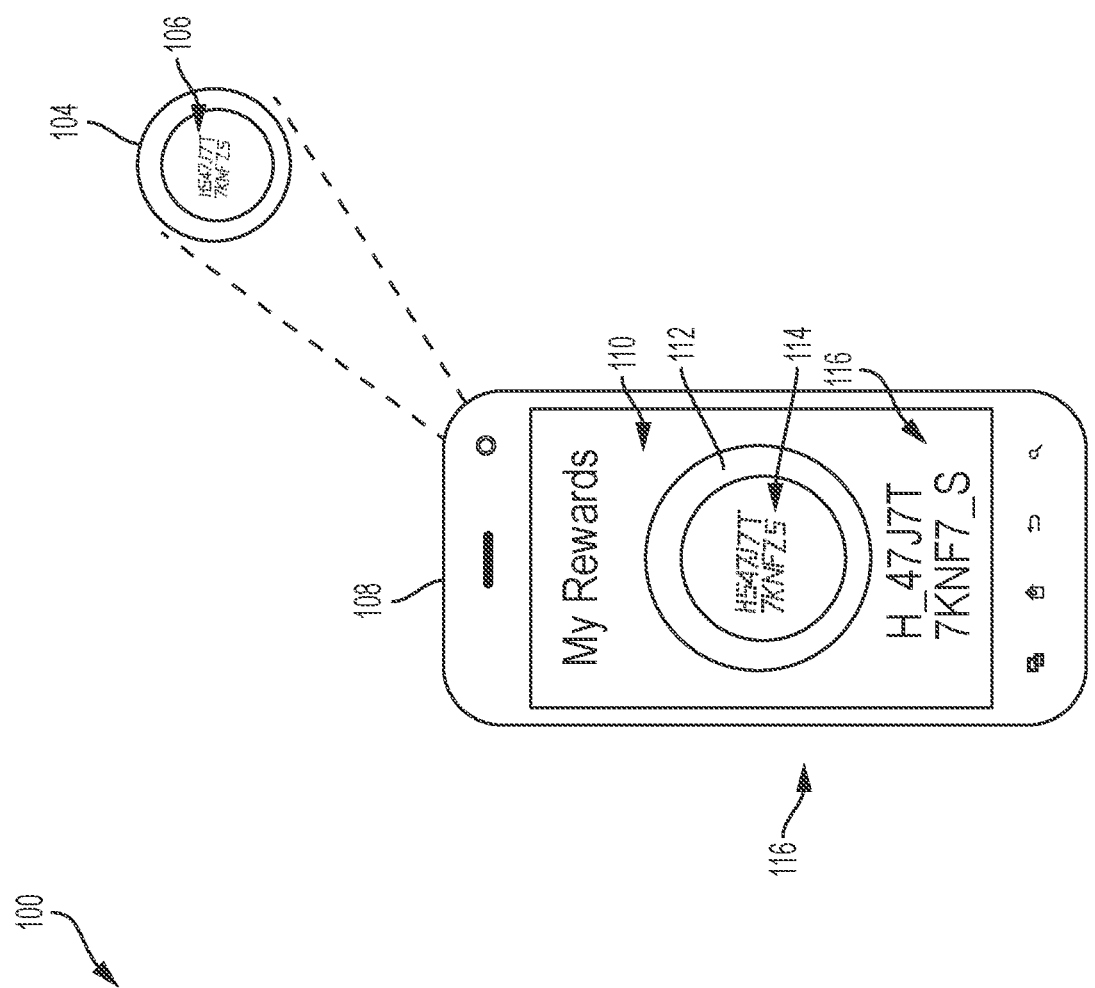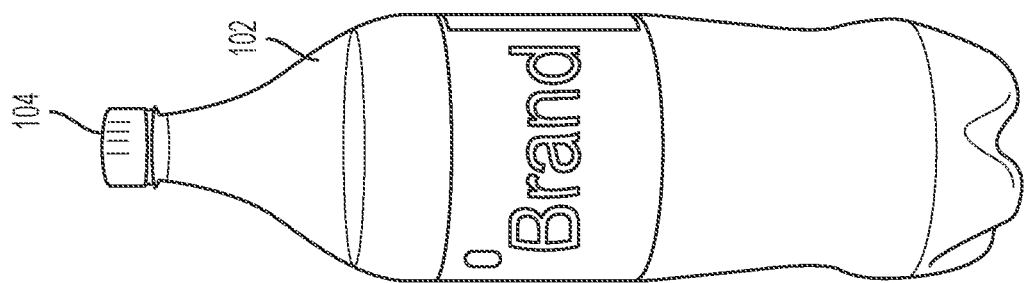
FIG. 1

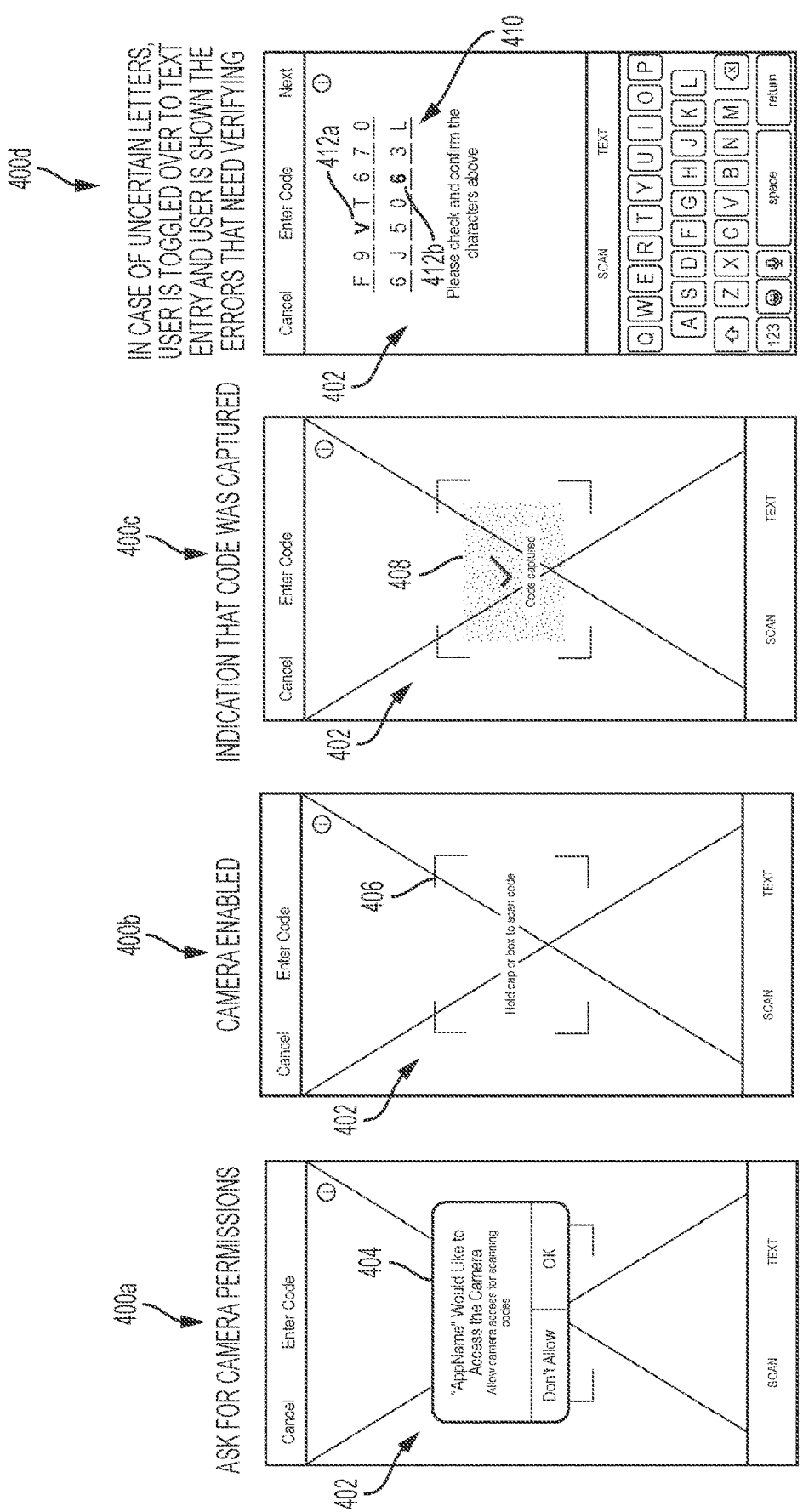

SYSTEM AND METHOD FOR CHARACTER RECOGNITION MODEL AND RECURSIVE TRAINING FROM END USER INPUT

CROSS-REFERENCE TO RELATED APPLICATIONS

This application is a national stage application filed under 35 U.S.C. § 371 of PCT/US2018/018331 filed Feb. 15, 2018, which claims the benefit of U.S. Provisional Patent Application Ser. No. 62/460,601 filed Feb. 17, 2017, the disclosure of which is expressly incorporated herein by reference.

BACKGROUND OF THE INVENTION

Brand loyalty is important to marketers, especially consumer goods marketers. Brand loyalty can be built and maintained in many ways. One way that brand loyalty is created and maintained is through rewards points. Rewards points are typically collected by consumers through purchase or usage of products or services. In the case of food and beverage companies, products may be individually marked with a loyalty code (hereinafter "code") that consumers may enter into a website, for example, and receive points or other benefit (e.g., instant reward) associated with the code as established by the marketer. As a specific example, one beverage product marketer prints codes, generally with 14 characters, on an underneath surface of caps of bottles, on an inside surface of multi-beverage cartons, or elsewhere on beverage bottles, cartons, or other product packaging.

With the advancement of technology, especially mobile devices and cloud network communications, easier means of collecting the codes have been contemplated. Historically, website access to loyalty accounts have been available to consumers, and those sites have been accessible via mobile devices, where users can type in the codes. One process for simplifying submission of the codes has contemplated the use of imaging the codes using a built-in camera of a smart phone. However, a problem with imaging codes that exists is that smart phone imaging and image processing of the imaged codes have been unreliable due to a variety of factors, including size of characters, resolution of cameras, beverage stains covering portions of codes, font of codes, lighting and shadows when capturing codes, and many other factors. Due to the various factors that are problematic for imaging and image processing codes, especially codes printed with a pin code character format, the use of conventional optical character recognition (OCR) does not provide commercially reliable results. As a result, marketers have been unwilling to support a mobile imaging solution so as to not negatively impact consumer loyalty.

SUMMARY OF THE INVENTION

To provide for imaging capabilities and image processing codes, including those printed with a pin code character format, that are accurate enough for consumer usage and for marketers to support a brand loyalty program, an image capture and image processing process that has commercially acceptable character recognition rates may be utilized. The image processing may include the use of machine learning by a neural network, and enable consumer participation for active learning with a production mode that supports a loyalty program.

In an embodiment, characters of the code may be printed with a pin code character format, which include dots that provide for low resolution characters, as understood in the art. It has been found that conventional optical character recognition (OCR) algorithms do not handle pin code, low-fidelity characters sufficiently accurately for commercial usage. To provide for an image processing capable of resolving pin code characters, an embodiment may use an image capture, character segmentation, and neural network character recognition modeling and matching process. After proper training, the process may provide for a high confidence levels (e.g., 95%) that each character is accurately identified, where the training may further use active learning through the engagement of many consumers, thereby improving accuracy of character recognition in an expedited manner. In an embodiment, the user interface, such as a browser-based user interface or mobile app, may provide feedback of one or more individual characters that may have low confidence scores (e.g., below 95%, 80%, or otherwise) that are indicative of characters not being correctly recognized or recognized with a high enough degree of probability by image processing.

One embodiment of a process of reading a multi-character code may include identifying regions in which respective characters of the code reside in response to receiving an image of the multi-character code. The identified regions may be applied to a neural network to determine the respective characters in the identified regions. The determined characters may be displayed in an ordered sequence for a user to visually inspect to confirm that each of the determined characters are correct. A system may be configured to support the process.

One embodiment of a method may include receiving at least one image inclusive of an image of a multi-character code and data representative of text characters that represent respective image characters of the multi-character code. At least a portion of the data entered by a user may be received. The image(s) and data may be applied to a set of image and data used to train a neural network and configured to process images to identify characters within the images. The neural network may be updated based on the image(s) and corresponding data received from a user.

BRIEF DESCRIPTION OF THE DRAWINGS

Illustrative embodiments of the present invention are described in detail below with reference to the attached drawing figures, which are incorporated by reference herein and wherein:

FIG. 1 is an illustration of an illustrative scene, in this case a scene with a beverage bottle inclusive of a beverage, such as a soft drink;

FIG. 4A-4D are screenshots of an illustrative user interface that may enable a user to capture a code;

DETAILED DESCRIPTION OF THE INVENTION

Figure 2:
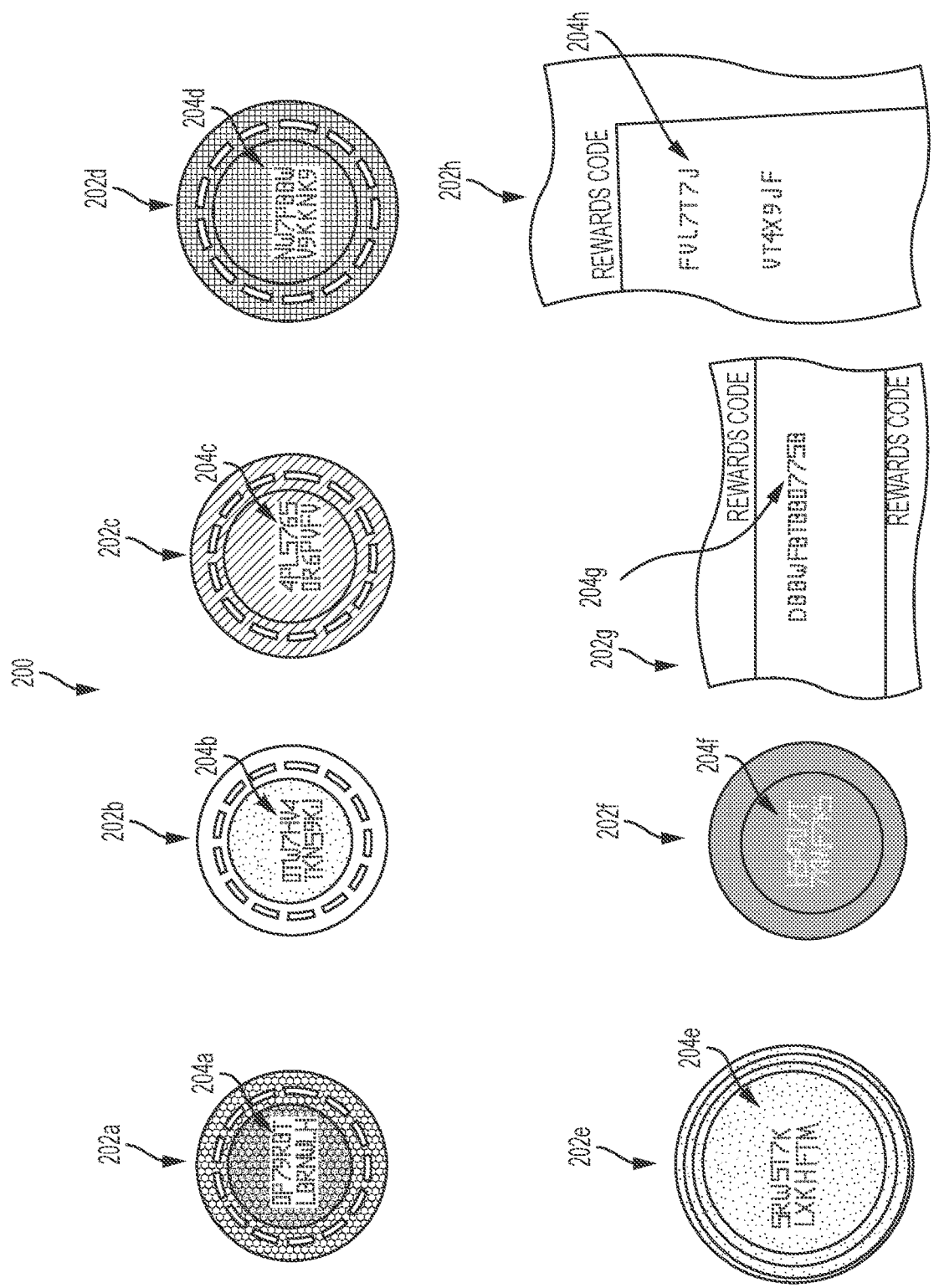
FIG. 2 is an illustration of a set of illustrative consumer packaging components, including bottle caps and cartons, on which codes may be respectively printed using a pin code character format.

With regard to FIG. 1, an illustration of an illustrative scene 100, in this case a scene with a beverage bottle 102 inclusive of a beverage, such as a soft drink, is shown. The beverage bottle 102 includes a cap 104 on which a multi-character code 106 may be printed. As is common, the multi-character code 106 may be printed using a low-resolution pin code character format, and be positioned on an inside surface of the cap 104 so as to be available to a user after purchase and when opened. The code 106 may be submitted to a website, and a value associated with the code 106 as established by a marketer of a product, in this case a beverage, may be applied to an account of the user.

As further shown, a mobile device 108, such as a smart phone, may be used to image the code using a standard camera feature that exists on the electronic device 108. A user interface 110 may provide for displaying an image 112 of the code 106, and a set of characters 116 determined by image processing the image 114 of the code 106 may be displayed. As described further herein, the image processing may use a neural network so as to provide for pin code character recognition with commercially satisfactory rates that are commercially acceptable. As further shown, within the set of characters 116, blank character spots, shown as underscores, that were not able to be interpreted or were interpreted or matched with low confidence or probability levels by a neural network, such as a convolutional neural network (CCN), may be displayed so that a user may be able to manually add and/or correct characters for those characters identified with low probability matching. In an embodiment, a user interface keyboard or audio transcription feature may be used on the mobile device 108. The user interface 110 may also enable a user to change all the characters, but characters that cannot be interpreted by the image processing may be displayed as blank characters (e.g., underscores) or other indicia (e.g., characters displayed in another format, such as in the color red, bold, within a box, or otherwise).

With regard to FIG. 2, an illustration of a set 200 of illustrative consumer packaging components, including bottle caps 202a-202f and cartons 202g-202h, on which codes 204a-204h may be respectively printed using a pin code character format is shown. Other print formats may also be utilized. As shown, the bottle caps 202a-202f each have different colors and each of the respective codes 204a-204f are printed with different colors. The colors of the bottle caps 202a-202f may range from light to dark colors, including white, gray, green, red, black, or any other color, which may be considered background colors relative to colors of codes printed thereon or displayed in front of the caps. The codes 204 may be printed in foreground colors that may, for example, range from white to black, as well. As understood in the art, a plastic or other substrate component that may be transparent or translucent and used for bottle sealing purposes may be disposed over the printed codes, and the plastic component may have a different color (e.g., light blue) from the color (e.g., black) of the code, as well. The codes may alternatively be printed on the plastic component. The plastic component tends to introduce some amount of image noise or image distortion when the printed code is imaged by a user, as further described herein. The cartons 202g and 202h may have codes 204g and 204h printed thereon, and the cartons 202g and 202h may have different texture, color, and print quality than those of the caps 202a-202f.

In an embodiment, the code 204g is printed on a single line, whereas the codes 204a-204f and 204h are printed on two lines. It should be understood that the codes may be printed in a variety of different formats and with different number of characters. In an embodiment, the codes may be encoded to include certain metadata, including product identifier, date of production, particular promotion, color of background and/or foreground colors, and/or any other metadata as desired by the marketer to support product promotion, manufacturing, distribution, and/or loyalty program.

Figure 3:
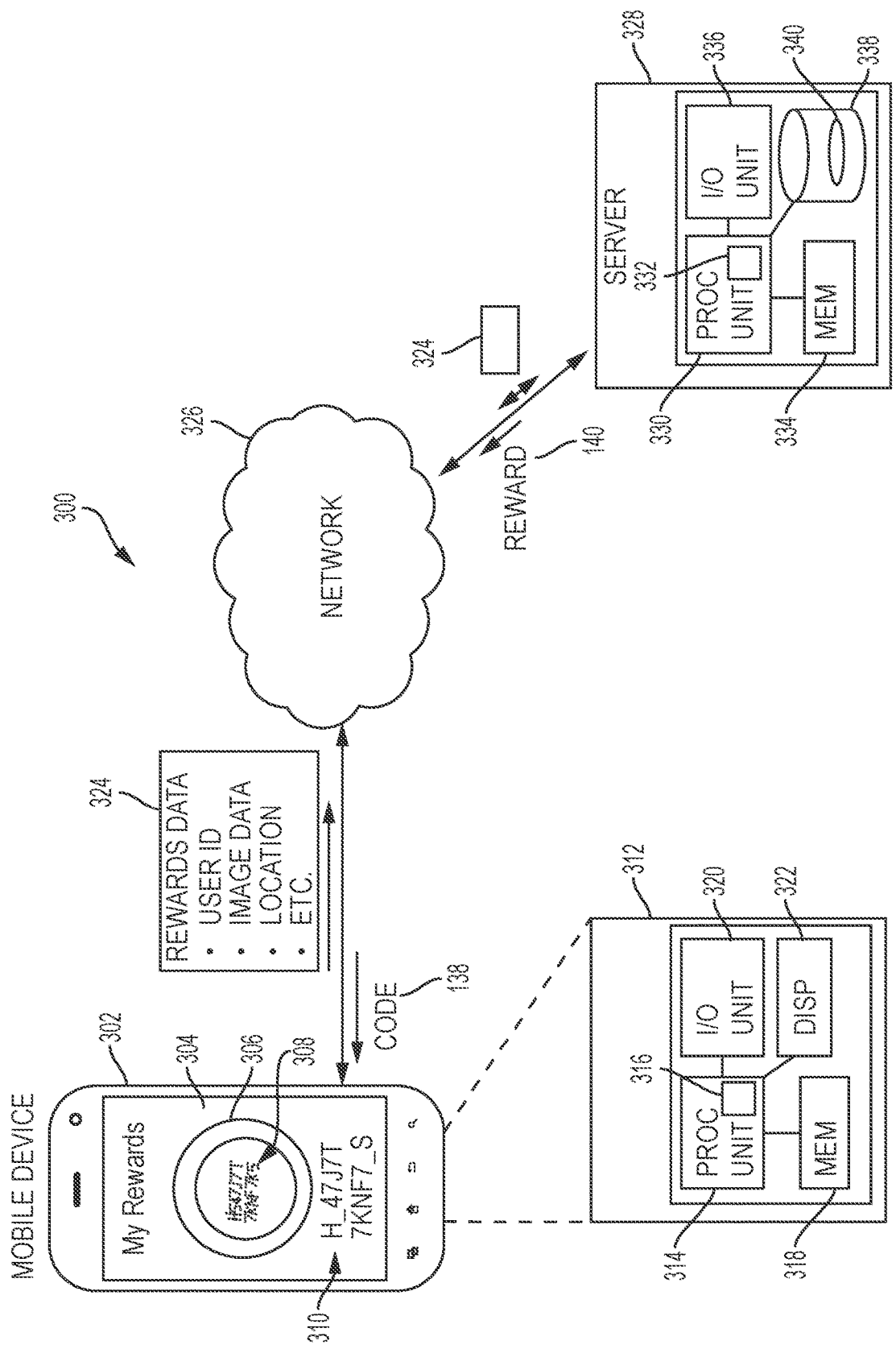
FIG. 3 is an illustration of an illustrative network environment configured to support a consumer product loyalty program that utilizes image processing as described herein.
Figures 5A, 5B, 5C, 5D:
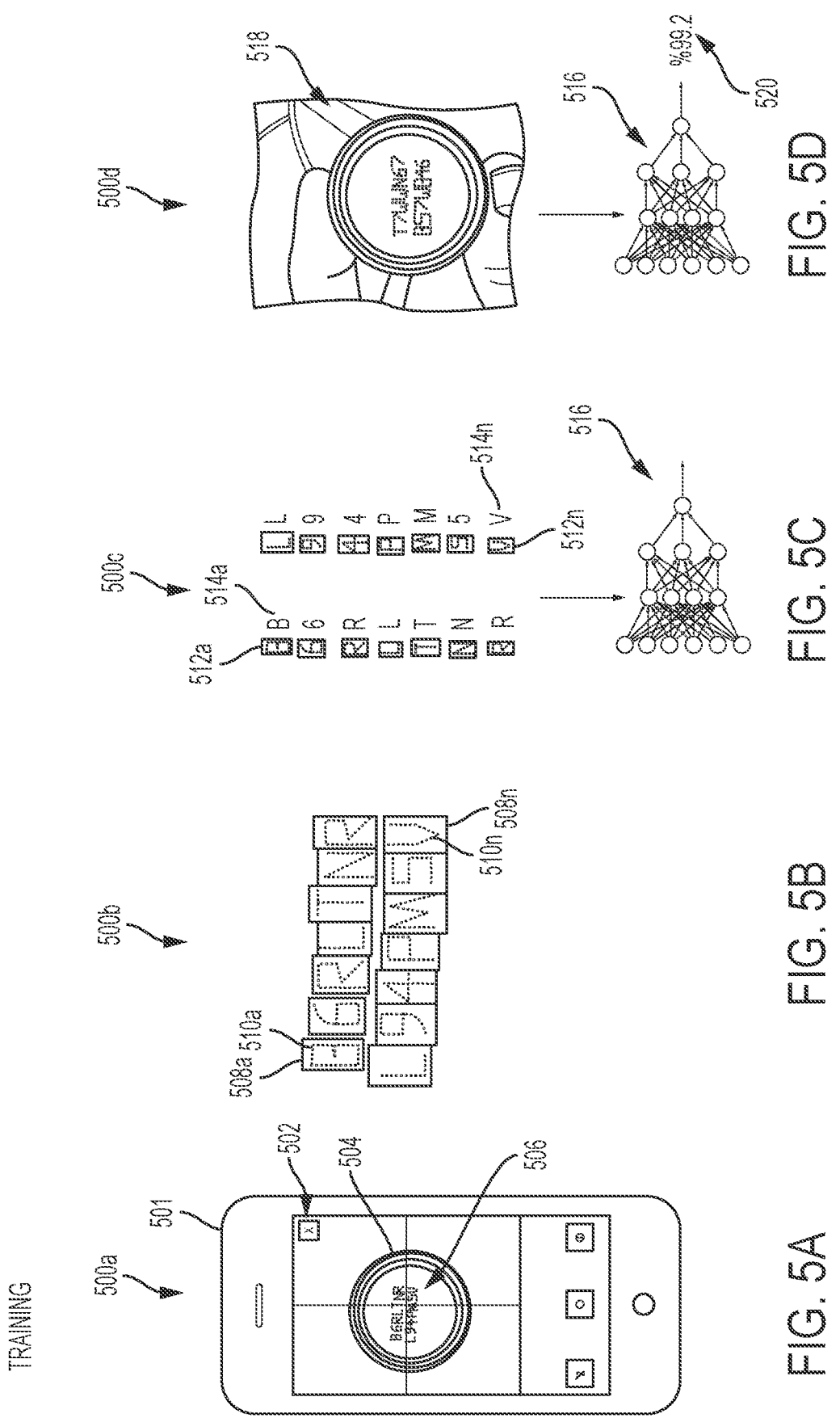
FIGS. 5A-5D are illustrations of steps are shown to be used for training a neural network for image processing pin code characters of codes.

With regard to FIG. 3, an illustration of an illustrative network environment 300 configured to support a consumer product loyalty program that utilizes image processing as described herein is shown. The network environment 300 may include a mobile device 302 on which a user interface 304 is shown to include an imaged bottle cap 306 including an imaged code 308 printed thereon. It should be understood that a user may image other objects on which codes may be printed for promotional or other purposes by a marketer. A set of characters or otherwise 310 that is determined from the imaged code 308 using image processing, as further described herein, is shown. Moreover, it should be understood that the multi-character code 106 (FIG. 1) may be printed on a variety of different substrates, including plastic (e.g., underneath bottle caps), cardboard (e.g., inside of cartons that contain multiple beverage products), paper (e.g., scratch tickets, calling cards, etc.), and so on. Moreover, the multi-character code 106 may be in the form of structured sentences, words, or otherwise.

The mobile device 302 may include electronics 312 that include a processing unit 314 that executes software 316. The software 316 may be configured to operate the mobile device, and may further be configured to participate with or perform image processing to determine characters of the imaged code 308. The processing unit 314 may be in communication with a memory 318 that may store data, such as the imaged bottle cap 306 and code 308, character matching data, add character matching data, and so forth, input/output (I/O) unit 320 configured to communicate over a communications network, and electronic display 320 (e.g., touch screen) for displaying a user interface with which the user may interface.

The mobile device 302 may be configured in a number of ways to provide for supporting image processing of the imaged code 308. Illustrative configurations may include communicating the entire image, portion of the image, and/or determined code to a cloud server for registering with an account of a user of the mobile device. In an embodiment, a set of rewards data 324, which may include user ID, rewards account ID, image data, determined code data, packing identification data, and/or location may be communicated from the mobile device 302 via a communications network 326 to a server 328. Additional and/or alternative information may be communicated along with the rewards data 324 for utilization with a loyalty or other program.

The image data may include one or more image segments of the imaged code 308. In an embodiment, the software 316 may be configured to determine sub-areas of the imaged code 308 in which respective characters are positioned. It should be understood that additional information may be included with the rewards data 324, such as mobile ID, lighting information, color information, and/or any other information associated with the imaged code, cap, or otherwise that may be used in processing the imaged code 308. Moreover, correction data and/or training data in the form of character(s) entered by a user may be communicated with the rewards data 324 so that a neural network executed by the server 328 may be trained in an active learning mode to improve future image processing.

The server 328 may include a processing unit 330 that executes software 332. The software 332 may be configured to operate and manage a neural network used for determining characters of the imaged code 308. The processing unit 328 may be in communication with a memory 334 that may store data, such as the imaged bottle cap 306 and code 308, input/output (I/O) unit 336 configured to communicate over the communications network 326, and storage unit 338 on which one or more data repositories 340 may be operated. The one or more data repositories 340 may store accounts of users who participate in one or more rewards programs for consumer products. The software 332 may be configured to support a master or central neural network that is used to perform image processing on images including code characters, such as the imaged code 308 having a pin code character format. It should be understood that the neural network may be performed on a separate server from a server that manages user accounts for the loyalty or rewards program. In operation, the server hosting the neural network (or master copy thereof) may be in communication with one another such that the rewards program server, in response to receiving a communication with the image code 308 along with the rewards data 324, may communicate the image code and/or rewards data 324 to the neural network server for processing thereby.

The neural network may initially be trained and thereafter updated based on active learning in response to user feedback and may be centrally maintained. The neural network may be downloaded to local or "edge" servers of the network 326 or to mobile devices of consumers who participate in the loyalty program for execution thereon, where the neural network or any operate in a mobile app or via a browser, as understood in the art. It should be understood that the image processing using a neural network, including training and E active learning, may be performed on a mobile device, or on a network, or combination thereof.

With regard to FIG. 4A-4D, screenshots 400a-400d of an illustrative user interface 402 that may enable a user to capture a code are shown. The user interface 402 may initially provide a message for a user that requests that the user provide access to a camera of the mobile device on which the user interface is operating. In response to the user's acceptance to allow an app to use the camera, the user interface 402 may present the user with an imaging region 406 in which the user is to image a code, as shown in FIG. 4B. In one embodiment, the user may be able to scan a machine-readable code (e.g., barcode, QR code) or text (e.g., 14-character code) or other characters. As shown in FIG. 4C, an app being executed by the mobile device may determine that the code is fully encompassed within the image in region 406 and automatically capture the image and display a message 408 on the user interface 402 that the code has been successfully captured. Alternatively. The user may manually capture the character(s) 410 and/or code. As shown in FIG. 4D, a sequence of characters 410 may be displayed after being determined from an imaged code by a neural network, as further described herein.

The neural network may be executed by the mobile device, remote server, or a combination thereof. In response to determining that one or more characters have been determined with less certainty probability than a probability threshold level, blank characters or characters in an alternative format (e.g., different color, such as red or other highlight), may be displayed to indicate to the user to correct or verify those character(s). As indicated, characters 412a and 412b are determined to have lower certainty than the probability threshold, thereby necessitating that the user confirm or correct those characters 412a and 412b. Rather than displaying characters in a different format with certainty levels less than the certainty threshold, blank characters, as shown with underscores in FIGS. 1 and 3, may be presented to the user. Still yet, if a probability level of proper identification or recognition of a character is within a range, such as about 80% and about 95%, then a determined character may be displayed in a different format than characters determined with probabilities above the probability threshold level. If the certainty level is below a lower probability threshold level, such as about 80%, then a blank character may be displayed in a different format than those characters determined with probability over the lower probability threshold level. In an embodiment, the neural network, which may be a convolutional neural network, may be operated by the mobile device, or one more images of image characters and/or text character(s) submitted by a user may be communicated to a remote server for determining each of the characters, and determined characters may be communicated back to the mobile device for display on the user interface 402. The characters submitted by the user may be used for active learning by the neural network for machine learning.

With regard to FIGS. 5A-5D, steps 500a-500d are shown to be used for training a neural network for image processing pin code characters of codes. In an embodiment, a training phase may be performed prior to the application going "live" to consumers (i.e., users of mobile devices who participate in a rewards program). During the training phase, a mobile app may be distributed to a group of suppliers dedicated to training, and who have also been given a set of bottle caps and paperboards to photograph and label via the training app. The image in step 500a is an illustrative representation of the dedicated training app. Training may continue via consumer input once a promotional app is live in production (i.e., consumer usable for a promotion program).

More particularly, the process may start at step 500a, where a user may use a mobile device 501 that executes a mobile app or user interface via a mobile browser and web-based application may be presented with a user interface 502 to capture an image of a bottle cap 504 on which an imaged code 506 is printed. At step 500b, image segments or image portions 508a-508n (collectively 508) inclusive of respective imaged characters 510a-510n (collectively 510) are shown. The image portions 508 may be segmented from the captured image by the mobile app being executed by the mobile device 501. Alternatively, the imaged code 506 may be communicated to a server operating on a communications network, and the server may perform the segmentation of the characters in the imaged code 506. By identifying image portions 508 of each of the characters 510, image processing using a character recognition process by a neural network may be easier.

At step 500c, the image segments 512a-512n (collectively 512), which may be the same as the image portions 508 along with characters 514a-514n (collectively 514), which may be text representations of the imaged characters 510, are shown. The characters 514 may be manually submitted by a user to train the neural network 516. Alternatively, the characters 514 may be identified using image processing and confirmed and/or corrected by a user. The training of the neural network 516 may be performed so as to improve performance of identification of pin code characters that have low resolution, and are printed and imaged in a variety of ways (e.g., printed on different colors and with different colors, having different colored translucent substrates placed thereon, printed on different substrates captured with different lighting, captured with different noise components, printed in different locations, and so forth). As users of mobile devices who participate in rewards programs may be quite large, further training of the neural network 516 through "active learning" while in production (see FIGS. 6A and 6B) may be performed rapidly using a large set of additional training codes being submitted, thereby leading to a highly accurate neural network. At step 500d, a test of the accuracy of the model may be performed by using test pin code images, such as pin code image 518, in which the neural network 516 may produce an output with a confidence percentage 520 that may be used to determine how confident the character recognition model is with regard to one or more characters of the imaged code.

Figure 6A:
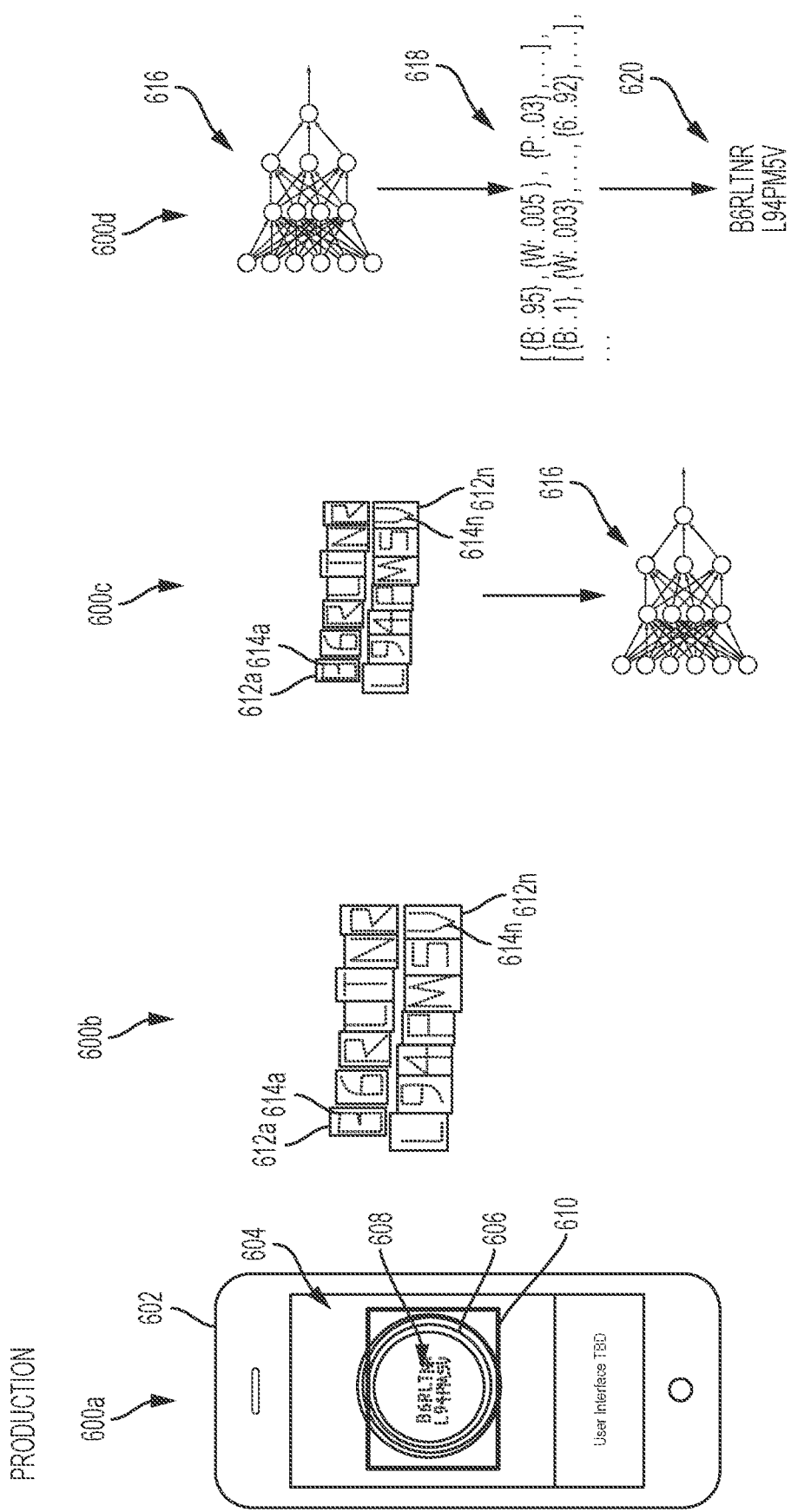
FIGS. 6A and 6B are a set of illustrative steps that may be used in supporting a promotional rewards system and including operating a character recognition model for imaging and identifying codes.
Figure 6B:
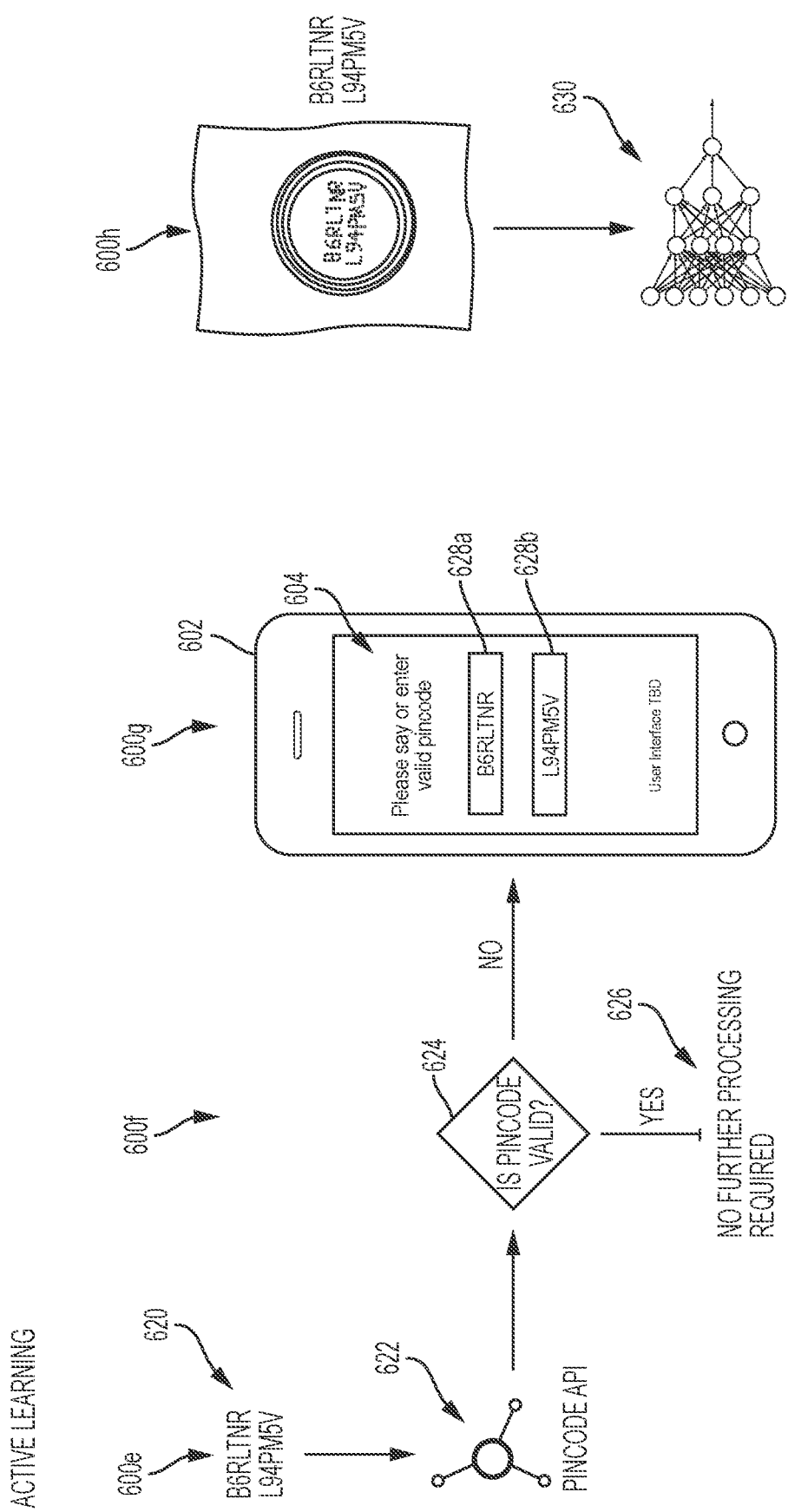

With regard to FIGS. 6A and 6B, a set of illustrative steps 600a-600h that may be used in supporting a promotional rewards system and including operating a character recognition model for imaging and identifying codes in an image during production is shown. At step 600a, a mobile device 602 may be configured to display a user interface 604 that includes an image captured by a camera of the mobile device 602. As shown on the user display 604, an imaged bottle cap 606 includes a printed code 608. In an embodiment, an image region 610 may be displayed with a graphical representation such that the user knows to position the code 608 within the image region 610 for automatic imaging. At step 600b, after the code 608 is imaged, the app being executed on the mobile device 602 may be configured to generate image segments that include regions 612a-612n (collectively 612) in which imaged characters 614a-614n (collectively 614) are included. Alternatively, the imaged bottle cap 606 may be sent to a server to be segmented by an image processing application. As shown in step 600c, the image segments may be communicated and/or processed by a neural network 616 configured as a character recognition model for determining characters and providing match probabilities associated with each of the determined characters 618. The neural network 616 may be executed on the mobile device or a remote server.

As shown, the determined characters and match probabilities 618 may be performed multiple times so that an overall probability score (e.g., average probability) for each character may be determined. Once the overall probability scores are determined, a determination as to whether those individual probability scores are above a minimum probability score threshold level may be made. If a probability score is above the minimum probability score threshold level, then the associated character is determined to be known. If an overall probability score is below the minimum threshold probability value, then a determination that the associated character is unknown or has some level of uncertainty, then the app may display or not display the associated character for a user to correct and/or confirm. A character sequence 620 may be output for use in providing the user with a value associated with the code as part of a loyalty program. Other uses of the code may additionally and/or alternatively be provided to the user.

At step 600e, an active learning process for recursive training may be supported, where the determined code 620 or pin code text may be validated by communicating the text 620 via a pin code API 622 for validation of the code 620. In an embodiment, a checksum algorithm may be used to validate the code 620 without communicating to an API. At step 600f, a determination 624 may be made as to whether the pin code 620 is valid. If so, then no further processing may be performed at step 626. Valid code predictions and related images may be stored on a mobile device and communicated back to a network server (not shown) for further training of a neural network. In an embodiment, a validated code or flag indicating receipt of a valid code may be sent to a rewards server along with a user ID/account ID such that a reward may be posted to the user's account, entered into a sweepstakes, or other action may be taken. Otherwise, the process may present the user interface 604 to the user of the electronic device 602 with text boxes 628a and 628b. In one embodiment, the user interface 604 may enable a user to selectively enter one or more characters of the pin code 620. In an embodiment, the user may be requested to submit each of the characters of the code. At step 600h, the corrected pin code as entered into the text boxes 628a and 628b may be communicated back to a network server (not shown) for further training of a neural network 630.

Figure 7:
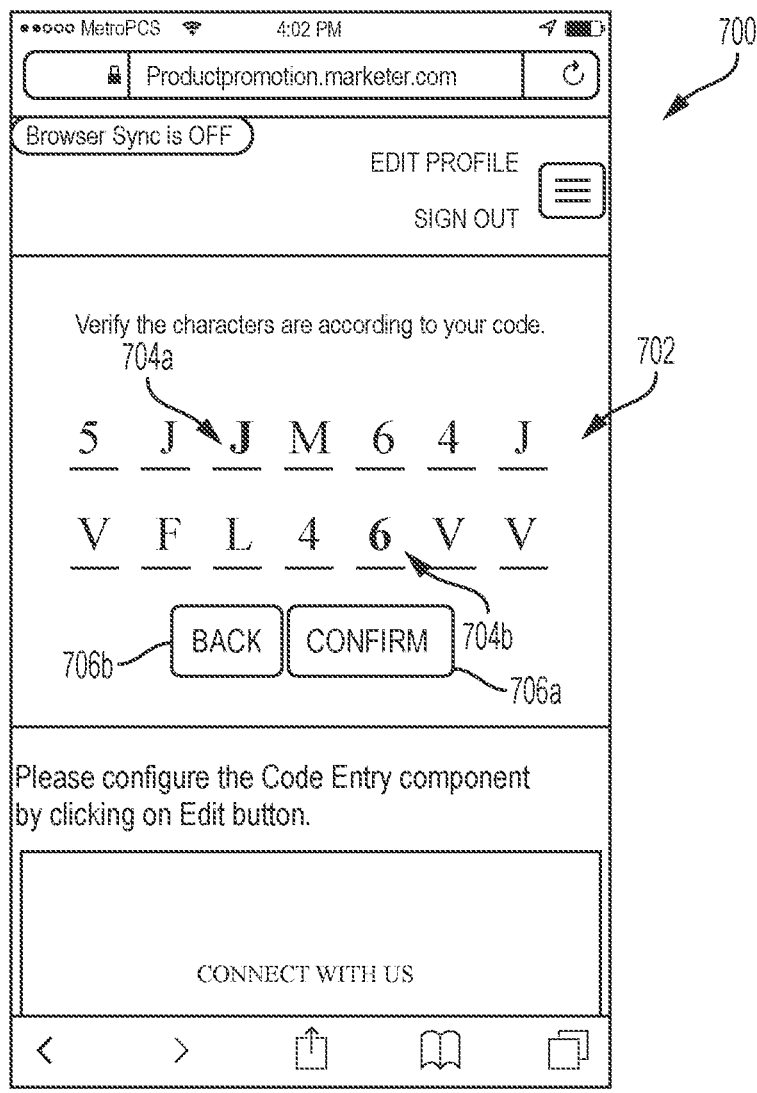
FIG. 7 is a screenshot of an illustrative user interface in which characters of a code may be displayed.

With regard to FIG. 7, a screenshot of an illustrative user interface 700 in which characters 702 of a code may be displayed is shown. Characters 704a and 704b that have a probability less than a minimum probability threshold value, such as 95%, may be displayed with a highlight (e.g., red, bold, etc.) or shown as blank characters or spaces with underscores, for example. The user may confirm, add, and/or replace the characters of lower probability to correct the characters of the code. It should be understood that any of the characters 702 may be replaced, but certain characters 704a and 704b that have low probabilities of being correct may be highlighted to draw attention of the user. Once complete, the user may select a "confirm" soft-button 706a. Alternatively, the user may proceed a "back" soft-button 706b. In an embodiment, the user interface 700 may prevent the user from continuing until the characters having low probabilities have been submitted by the user.

Figure 8:
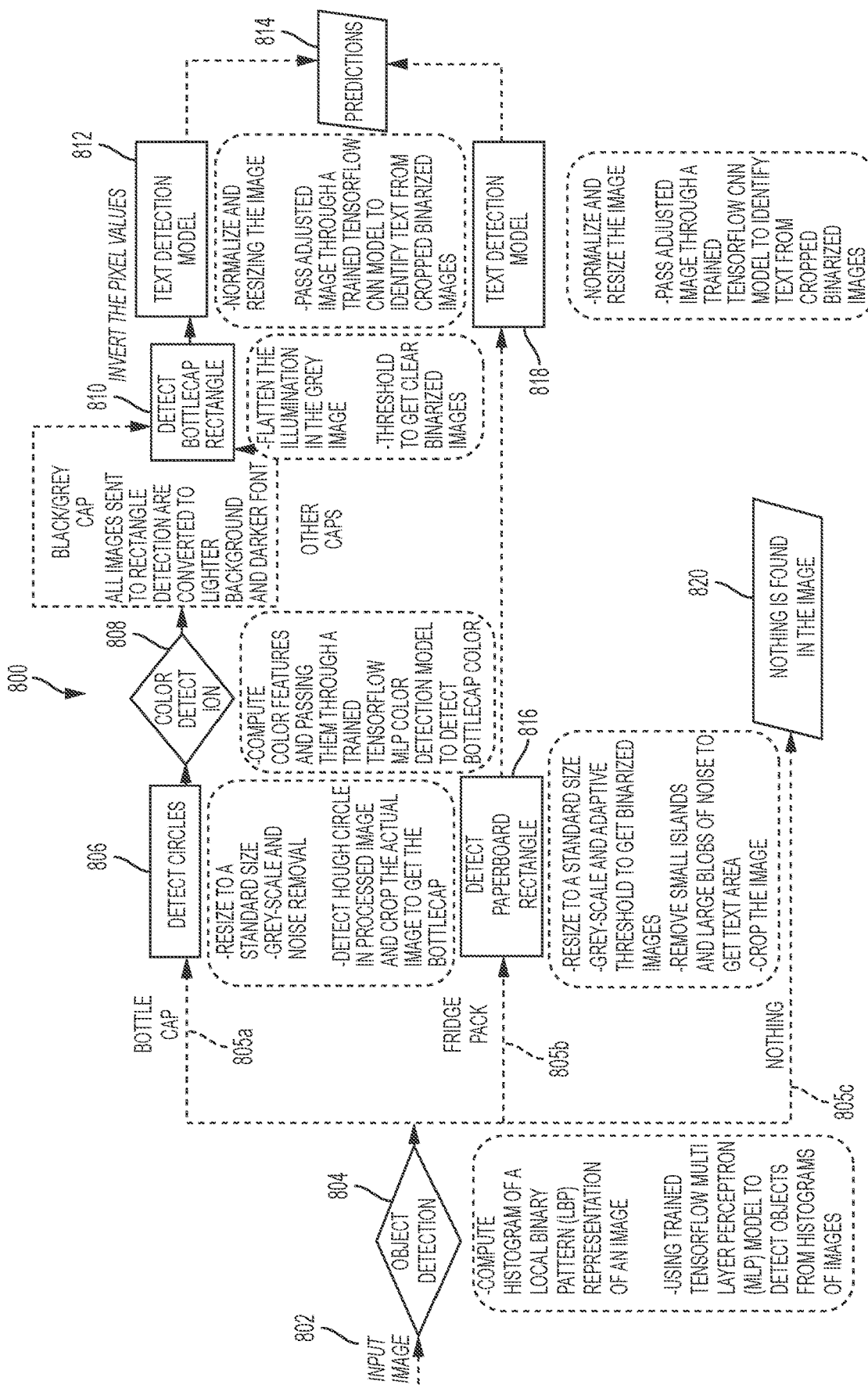
FIG. 8 is a flow diagram of an illustrative process that provides additional detail for imaging and image processing an imaged code on a bottle cap, carton, or otherwise.

With regard to FIG. 8, a flow diagram of an illustrative process 800 that provides additional detail for imaging and image processing an imaged code on a bottle cap, carton, or otherwise is shown. Generally, the process 800 may identify the type of media on which the code is printed, including a bottle cap or fridge pack, for example. Additionally, the process 800 may determine that the code is not identified so as to avoid failure of the process 800. The process 800 may be performed as described in each of the flow paths. In particular, colors may be identified and/or normalized so as to improve the ability to identify and read pin code characters.

More specifically, the process 800 may include receiving in input image 802 that is captured from a mobile device, as previously described. At step 804, a determination as to what type of object is detected may be made using three different flow-paths 805a-805c. As an example, the types of objects may include a bottle cap, fridge pack, or nothing. It should be understood that other types of objects may also be detected at step 804, as well.

In one embodiment, in detecting whether the object is a bottle cap, the process 800 may perform image processing to detect circles at step 806. In detecting whether any circles exist, a determination may be made as to whether any circles surround a code, which is indicative of a code being printed on the inside surface of the bottle cap, as shown in FIG. 2. The circle detection step 806 may further include (i) resizing an image to a standard size (e.g., resizing the circle to be sized to be a common size as circles in other images), (ii) performing a grey-scaling, and (iii) removing noise. A detect Hough circle analysis may be performed to process the image, and the actual image may be cropped to isolate the bottle cap.

At step 808, a color detection may be performed. In perform the color detection, a color feature computation may be performed by passing the colors through a trained TensorFlow MLP color detection model to detect color of the bottle cap. Images that are sent to rectangle detection may be converted to a lighter background and darker font.

In response to determining that the cap is black/gray, pixel values may be inverted prior to detecting a bottle cap rectangle at step 810. Other colored caps may not have the pixel values inverted. At step 810, in detecting a bottle cap rectangle, illumination in the grey image may be flattened. Additionally, to obtain a clear binarized image, a threshold value may be utilized so that light and dark colors may be distinguished (e.g., below the threshold brightness level is dark, and above the threshold brightness level is light). At step 812, a text detection model may be performed. In performing the text detection model, the image may be normalized and resized. The adjusted image may be passed through a trained tensor flow CNN model to identify text from the cropped, binarized images. At step 814, character predictions may be performed to predict a value of one or more characters being processed.

In determining whether the object is a fridge pack in flow path 805b, a paperboard rectangle detection may be performed at step at 816. In performing the paperback rectangle detection at step 816, the image may be resized to a standard size. The image may also be gray-scaled, and an adaptive threshold may be applied to produce a binarized image. Additionally, small islands and large blobs of noise may be removed to determine actual text area. The image may be cropped thereafter. At step 818, a text detection model may be applied to the adjusted image, and predictions of characters in the image may be made of step 814.

If no object is detected at step 804, then the process 800 may follow flow path 805c and simply return a response at step 820 that no characters and/or codes were identified in the image.

Figure 9:
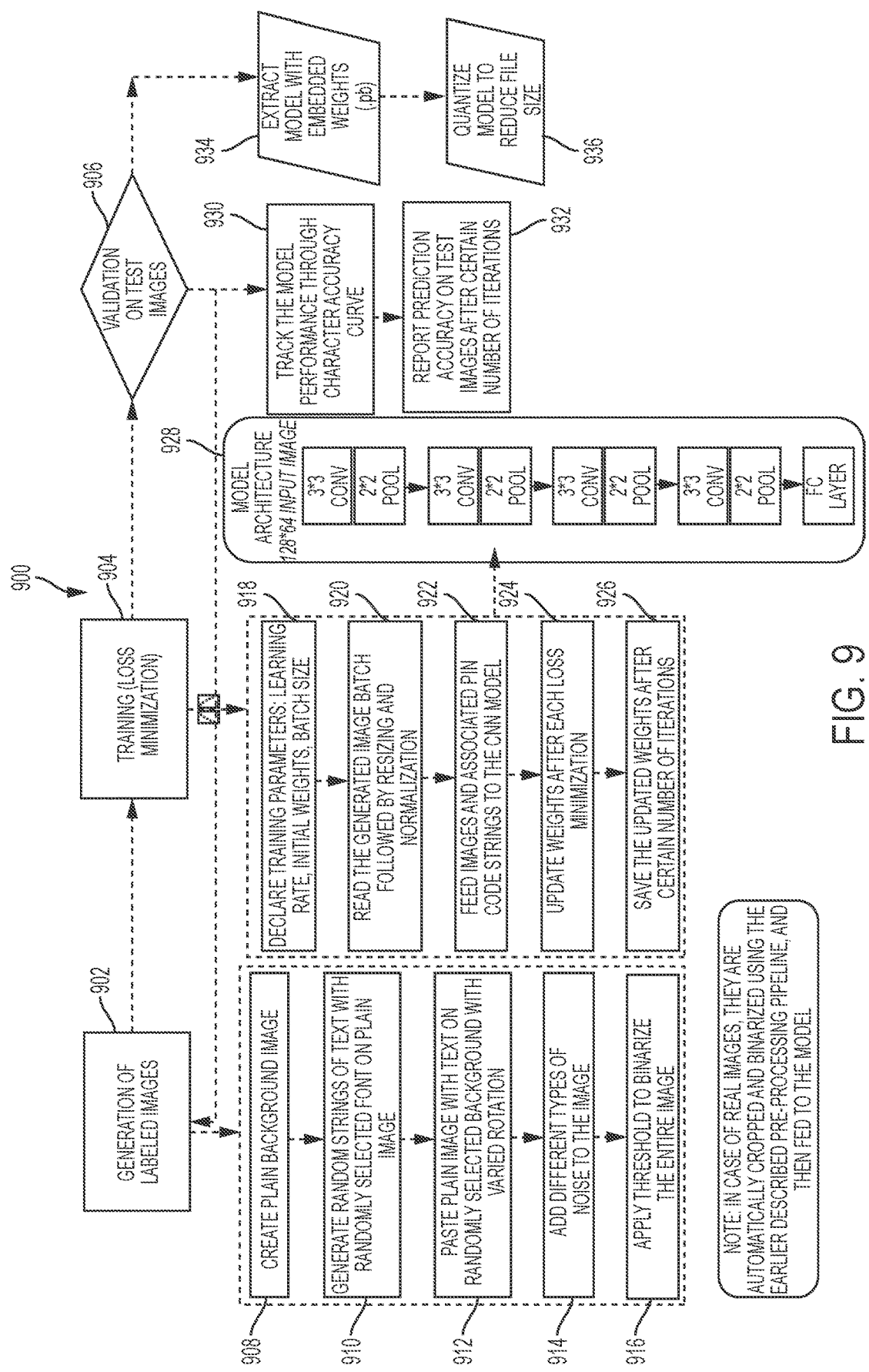
FIG. 9 is a flow diagram of an illustrative process for performing an end-to-end pin code recognition model training process.

With regard to FIG. 9, a flow diagram of an illustrative process 900 for performing an end-to-end pin code recognition model training process is shown. The process 900 may provide for generation of labeled images at step 902, training (loss minimization) at step 904, and performing a validation of test images at step 906.

More particularly, in generating labeled images at step 902, a plain background image may be created at step 908. At step 910, random strings of text may be generated with randomly selected fonts on a plain image. At step 912, the plain image with text may be pasted on a randomly selected background with varied rotation, and different types of noise may be applied to the image at step 914. The different types of noise may be applied to improve robustness of the model. At step 916, a threshold may be applied to binarize the entire image.

After generating labeled images at step 902, the training (loss minimization) may be performed at step 904. In performing the training, training parameters (e.g., learning rate, initial weights, batch size, etc.) may be declared at step 918. At step 920, the generated image batch may be read followed by resizing and normalization of the images. At step 922, the images and associated pin code strings may be fed to the convolutional neural network (CNN) model for processing thereby. Weights of the neural network model may be updated after each loss minimization at step 924, and at step 926, the updated weights may be saved after a certain number of iterations. The updated weights after each loss minimization may be applied to a model architecture 928 that is used for the neural network, as understood in the art. In an embodiment, hyperframes, as understood in the art, that utilizes a number of iterations and loss function, may be utilized. The training set may also include images of real pin codes printed on consumer packaging. The images may be created by users during a training or active learning process.

The validation on test images process that step 906 may include the steps of tracking the neural network model performance through a character accuracy curve at step 930, and reporting prediction accuracy on test images after a certain number of iterations at step 932. The process 900 may also include extracting the model with embedded weights at step 934, and quantizing the model to reduce file size at step 936.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A method of reading a multi-character code, said method comprising:
   in response to receiving an image of the multi-character code, identifying regions in which respective characters of the code reside;
   applying the identified regions to a neural network to determine the respective characters in the identified regions;
   displaying the determined characters in an ordered sequence for a user to visually inspect to confirm that each of the determined characters are correct;
   displaying a character determined to have a probability of character recognition below a threshold probability level in a format different from characters determined to have probability levels of character recognition over the threshold probability level so as to notify the user to review the character determined to have the probability level below the threshold probability level;
   receiving a corrected character for the character determined to have the probability level below the threshold probability level;
   training the neural network with training data inclusive of a portion of the image and the corrected character; and
   responsive to a determination that the neural network has been improved as a result of being trained with the portion of the image and the corrected character, communicating the improved neural network or parametric data associated therewith to an electronic device of the user used to capture the image.

2. The method according to claim 1, wherein receiving the image of the multi-character code includes receiving the image of the multi-character code in which the characters are printed with pin code characters.

3. The method according to claim 2, wherein receiving the image includes receiving the image captured by a mobile device of a user, and wherein the multi-character code is captured from a consumer package.

4. The method according to claim 1, further comprising:
   normalizing at least a portion of the image including the code to adjust color of the at least a portion of the image; and
   wherein applying the identified regions to the neural network includes applying the identified regions that have been normalized.

5. The method according to claim 1, further comprising enabling the user to enter the one or more corrected characters for each character in the different format.

6. The method according to claim 1, further comprising responsive to receiving the one or more corrected characters from the user, applying the one or more corrected characters to a training set of characters to train the neural network.

7. The method according to claim 5, wherein enabling the user to enter the one or more corrected characters includes enabling the user to type or verbally enter the one or more corrected characters.

8. The method according to claim 1, further comprising determining a media on which the code is printed.

9. The method according to claim 8, wherein determining a media on which the code is printed includes determining whether a circle surrounds the code.

10. The method according to claim 1, wherein displaying the character determined to have the probability of character recognition below the threshold probability level in the different format includes displaying the character with a different color, font, background or other visually distinctive feature with respect to the displayed characters determined to have probability levels of character recognition over the threshold probability level.

11. The method according to claim 1, further comprising detecting a geometric shape surrounding the characters.

12. The method according to claim 11, further comprising resizing the geometric shape to a standard size.

13. The method according to claim 12, further comprising performing a grey-scaling and noise removal.

14. The method according to claim 1, further comprising:
   determining a corresponding value associated with the determined characters in the ordered sequence; and
   applying the corresponding value to an existing set of values associated with the user.

15. A method, comprising:
receiving at least one image inclusive of an image of a multi-character code and data representative of text characters that represent respective image characters of the multi-character code,
wherein the data representative of text characters that represent respective image characters includes text characters generated by a neural network based on the image, and
wherein the data representative of text characters that represent respective image characters includes data entered by a user to change a character generated by the neural network, and
applying the at least one image and data to a set of images and data used to train the neural network and configured to process images to identify characters within the images;
updating the neural network based on the at least one image and corresponding data received from a user; and
responsive to determining that the neural network has been improved as a result of being updated by the at least one image and portion of the data received from the user, communicating the improved neural network or parametric data associated therewith to an electronic device of the user used to capture the at least one image.

16. The method according to claim 15, further comprising:
determining a corresponding value associated with the data representative of the text characters; and
applying the corresponding value associated with the data representative of the text characters to an existing set of values associated with the user.

17. The method according to claim 15, wherein receiving the data includes receiving the data inclusive of an identifier indicative of data entered by a user to change a character generated by the neural network.

* * * * *